United States Patent [19]

Fujikawa

[11] Patent Number: 5,380,187

[45] Date of Patent: Jan. 10, 1995

[54] PRE-PLASTICIZATION TYPE INJECTION MOLDING MACHINE

[75] Inventor: Misao Fujikawa, Kaga, Japan

[73] Assignee: Sodick Co., Ltd., Kanagawa, Japan

[21] Appl. No.: 19,683

[22] Filed: Feb. 19, 1993

[30] Foreign Application Priority Data

Feb. 21, 1992 [JP] Japan .................. 4-072494

[51] Int. Cl.6 .............................................. B29C 45/54
[52] U.S. Cl. ................... 425/561; 425/568; 425/573; 425/585; 425/587
[58] Field of Search ............... 425/544, 557, 558, 559, 425/560, 561, 585, 587, 567, 568, 573

[56] References Cited

U.S. PATENT DOCUMENTS

| | | | |
|---|---|---|---|
| 2,159,559 | 5/1939 | Lawyer | 425/587 |
| 2,386,966 | 10/1945 | MacMillan | 425/587 |
| 2,950,501 | 8/1960 | Harkenrider | 425/557 |
| 3,083,408 | 4/1963 | Bichl | 425/567 |
| 3,274,648 | 9/1966 | Van Orman | 425/587 |
| 3,813,014 | 5/1974 | Guerin | 425/587 |
| 4,210,616 | 7/1980 | Eckardt et al. | 425/573 |
| 4,787,836 | 11/1988 | Osuna-Diaz et al. | 425/568 |

FOREIGN PATENT DOCUMENTS

| | | | |
|---|---|---|---|
| 80070 | 1/1963 | France | 425/561 |
| 642887 | 7/1962 | Italy | 425/585 |
| 56-44810 | 10/1981 | Japan | 425/559 |
| 57-87340 | 5/1982 | Japan | 425/561 |
| 3-97518 | 4/1991 | Japan . | |
| 865403 | 4/1961 | United Kingdom | 425/557 |
| 1720880 | 3/1992 | U.S.S.R. | 425/568 |

*Primary Examiner*—Jay H. Woo
*Assistant Examiner*—Duane S. Smith
*Attorney, Agent, or Firm*—Wenderoth, Lind & Ponack

[57] ABSTRACT

A pre-plasticization type injection molding machine is equipped with a plasticizing part for plasticizing synthetic resin material by turning a screw in a heating cylinder and an injection part for injecting the plasticized material through a nozzle by advancing and retreating an injection plunger into and from an injection cylinder. A conduit connects the tip of a plasticizing chamber, consisting of the heating cylinder, with the tip of an injection chamber consisting of the injection cylinder. The screw advances at the time of injection, closes the conduit with its tip. The opening of the conduit in the injection chamber is arranged on the periphery of a nozzle side-wall. An injection passage extends from the injection chamber toward the nozzle, the passage being open to the center of the nozzle side-wall. An injection by-pass extends from the injection chamber toward the injection passage, the injection by-pass being open on the nozzle side-wall to a region opposite to the conduit opening with the injection passage therebetween. As the injection plunger advances, dissolved material in the injection chamber is introduced in to the nozzle through the injection passage while material is retained after the previous injection is introduced in to the nozzle by way of the injection by-pass.

13 Claims, 6 Drawing Sheets

PRE-PLASTICIZATION TYPE INJECTION MOLDING MACHINE

BACKGROUND OF THE INVENTION

1. Field of the Invention

The present invention relates to a pre-plasticization type injection molding machine with a plasticizing part provided separately from an injection part, and more particularly, to the construction of an injection nozzle and injection chamber edge of a molding machine for eliminating the possibility of material retention in the injection chamber.

2. Description of the Prior Art

The pre-plasticization type injection molding machine comprises, in general, a plasticizing part having a screw, and an injection part having an injection plunger. Dissolved resin plasticized in the plasticizing part is supplied to the injection part's chamber by way of a conduit and is injected in the mold cavity through a nozzle from the injection plunger. Conventionally, there is provided a ball check valve in the conduit to prevent resin in the injection chamber from flowing backward to the plasticizing part when the injection plunger injects the resin.

As the present pre-plasticization type injection molding machine is equipped with an independent plasticizing part, it is more powerful in plasticizing than an in-line type injection molding machine, and works especially effectively in high-cycle molding. The ball check valve readily causes, however, dissolved resin retention, and such resin is prone to thermal decomposition and may cause trouble.

Lately the applicant proposed a pre-plasticization type injection molding machine without a ball check valve to resolve the above-stated problem. As shown in FIG. 9, an injection unit U' of a pre-plasticization type injection molding machine is composed of a plasticizing part 1 and an injection part 2 which are separately provided. The plasticizing part 1 has a plasticizing chamber 15 consisting of a heating cylinder 11, and the chamber is fitted with a screw 12. The cylinder 11 is provided with a driving part 4 at the rear. The driving part 4 has a built-in revolving drive unit and also a built-in linear drive unit to rotate and move the screw 12 forward.

The heating cylinder 11 is provided with a hopper (hopper port only is designated by 13). Resin material supplied from the hopper to the plasticizing chamber 15 is pressurized as it advances when the screw 12 rotates. It will be dissolved due to compression heat generated when kneaded by means of the screw 12 and heated by a heater 16 suitably arranged on the cylinder 11. Dissolved resin 14 is pushed forward toward a conduit 10 built at the tip of the cylinder 11.

The injection part 2 comprises an injection cylinder 20 having an injection nozzle 3 at its head. A plunger 21 is fitted in an injection chamber 22 formed by the injection cylinder 20. A driving part 5 is connected integrally with the rear end of the plunger 21. Upon instruction from a control part 50, an electromagnetic valve 51 is opened to supply a hydraulic chamber 53 of the driving part 5 with hydraulic oil to enable the plunger 21 to advance (moving to left in FIG. 9) to push dissolved resin in the injection chamber 2 into a mold cavity (not shown).

There is a conduit 30 ahead of the injection chamber 22, and the conduit 30 is connected with the conduit 10 in the plasticizing cylinder 11 to allow dissolved resin material 14 to flow from the plasticizing chamber 15 to the injection chamber 22.

In plasticizing and weighing, as the screw 12 starts to turn, it retreats to produce a conduit opening between the screw 12 tip and the conduit 10. With this, dissolved resin is fed to the injection chamber 22 of the injection part 2. In injecting, on the other hand, the screw 12 advances without rotating to close the conduit 10 with the tip, and dissolved resin is thereby stopped from flowing backward to the plasticizing chamber 15.

In particular, a pre-plasticizing type injection molding machine which moves the screw forward to prevent back from the injection chamber is able to eliminate dissolved material retention where a check ball valve is arranged. In addition, it provides not only exact weighing and very steady plasticization, but also high performance in reproducing molding conditions and rise characteristics and stability. It is also to be noted that the injection molding machine of the type realizes CAI (computer aided injection), computerizing a mold manufacturing machine with an injection molding machine on the basis of CAD (computer aided design) and CAM (computer aided manufacturing).

The injection molding machine U' has, in the meantime, an injection orifice 31 open (31a) to the center of a nozzle side-wall 34 in the injection chamber 22 and the plasticizing part conduit 30 is open (30a) to the periphery of the wall 34 of the cylinder as shown in FIG. 10.

For the purpose of maintaining pressure after injection, there is a clearance of several millimeters between the nozzle wall 34 and the injection plunger 21 at the advance position, which provides the resin with a specified holding pressure so as not to let sink marks be produced in the mold because of cooled resin in the mold cavity. Upon holding with pressure, weighing starts again, and dissolved resin flows with force from the conduit opening 30a to the injection chamber 22. Resin flow from the conduit opening 30a pressurizes the plunger head 21a since the plunger front 24' is made flat. Therefore, the new resin flow is not introduced to a closed space A opposite to the nozzle orifice opening 31a of the opening 30a, which makes the injection plunger 21 retreat. This is because resin flows from the conduit opening 30a in the arrow c direction as shown in FIG. 11. Accordingly, resin not washed in the new resin flow is retained in the closed space A, forming a deposit of resin.

As the plunger 21 retreats, dissolved resin flowing into the injection chamber 22 moves axially toward the injection cylinder 20 as shown in FIG. 12. Dissolved resin flows at the time as if it washes the injection cylinder 20 interior. Even then, there is retained resin in the space A opposite to the injection chamber 22 conduit opening 30a as the conduit opening 30a is open to the nozzle side-wall 34 at a biased position.

In addition, the injection orifice 31 is in the center, no resin flows, when injected, circumferentially toward the injection chamber 22, and almost no flow is caused with lets resin come off the injection chamber nozzle side-wall 34. Therefore resin in the closed space A opposite to the conduit opening 30a is pushed against the nozzle side-wall 34 and is readily retained without being injected when the plunger advances to the limit, though resin is somewhat affected by the advance speed of the plunger 21.

In particular, dissolved resin coming into the injection chamber from the conduit opening 30a flows in an arc along the injection cylinder 20 face due to its viscosity (streamline d) or flows as if crossing the injection chamber tip diametrically and reversely along the cylinder face (streamline e) as shown in FIG. 13. These flows d and e into the injection chamber form a meeting region $A_1$ and a distributary region $A_2$ where resin readily remains behind.

It is necessary to completely purge the remaining resin in the injection chamber 22 to change resin material colors (including the materials themselves). If there is a portion A in the injection chamber 22 in which it is difficult to wash away dissolved resin, even if only a little, purging must be carried out more often, and a quick changing of the arrangements may be prevented. If a material which is very thermally sensitive is put into use, the remaining resin may suffer adverse changes in chemical structure even when continuous injection molding is performed. Furthermore, permanent changes in physical properties may happen, deteriorating (aging) the quality of the resin.

Such a problem will be further revealed when a pre-plasticization injection molding machine, designed to prevent resin from flowing by advancing and retreating a screw, is operated to carry out more efficient and more accurate injection molding.

SUMMARY OF THE INVENTION

It is an object of the present invention to provide a pre-plasticization injection molding machine which is able to solve the above problem by using an improved injection nozzle to enable resin to flow into a mold from where resin is likely to be retained.

The present invention is related to a pre-plasticization injection molding machine equipped with a plasticizing part for plasticizing synthetic resin material by turning a screw in a heating cylinder and an injection part for injecting plasticized resin material through a nozzle by advancing and retreating an injection plunger into and from an injection cylinder. The tip of a plasticizing chamber, consisting of the heating cylinder, is connected to the tip of an injection chamber consisting of the injection cylinder, with a conduit. The conduit is closed with the tip of the screw that is advanced at the time of injection.

What characterizes the present invention first is that it is provided with the opening of the conduit arranged in the periphery of a nozzle side-wall of the injection chamber. An injection passage is open to the center of the nozzle side-wall at one end and connected to the tip of the nozzle at the other end. At least one injection by-pass is open at one end to a region opposite to the conduit opening, with the injection passage opening therebetween in the nozzle side-wall of the injection chamber, and leads at the other end to the injection passage. Resin material is introduced to the nozzle through the injection by-pass from where it is likely to be retained in the injection chamber.

What characterizes the present invention secondly is that it is equipped with an opening of the conduit arranged in the periphery of a nozzle side-wall of the injection chamber, an injection orifice which leads to the nozzle tip, and plural injection by-passes which are open at one end to the nozzle side-wall of the injection chamber and connect to the passage at their other ends. The material in the injection chamber is introduced to the nozzle by way of the plural injection by-passes.

The screw is at the retreat position at the time of weighing, and there is produced a certain clearance between the screw tip and the conduit opening to allow plasticized material in the plasticizing chamber to be introduced to the injection chamber by way of the conduit. The injection plunger retreats due to the plasticized material pressure when the material is collected to a specified level in the injection chamber before being weighed.

The injection plunger advances at the time of injection, and dissolved resin in the injection chamber is injected in to the cavity of a mold through the nozzle. Since dissolved material is introduced through the opening of the conduit arranged in the periphery of the nozzle side-wall, the material is readily retained in a portion A opposite to the opening. According to what characterizes the present invention firstly, the material is introduced through the opening in the center of the nozzle side-wall while the material in the portion A is introduced to the injection orifice through the injection by-pass.

According to what characterizes the present invention secondly, the material in the injection chamber is introduced to the injection orifice by way of plural injection by-passes arranged in the nozzle side-wall.

DESCRIPTION OF THE PREFERRED EMBODIMENTS

A description of the embodiments of the present invention will be given below, referred accompanying drawings.

Figure 1:
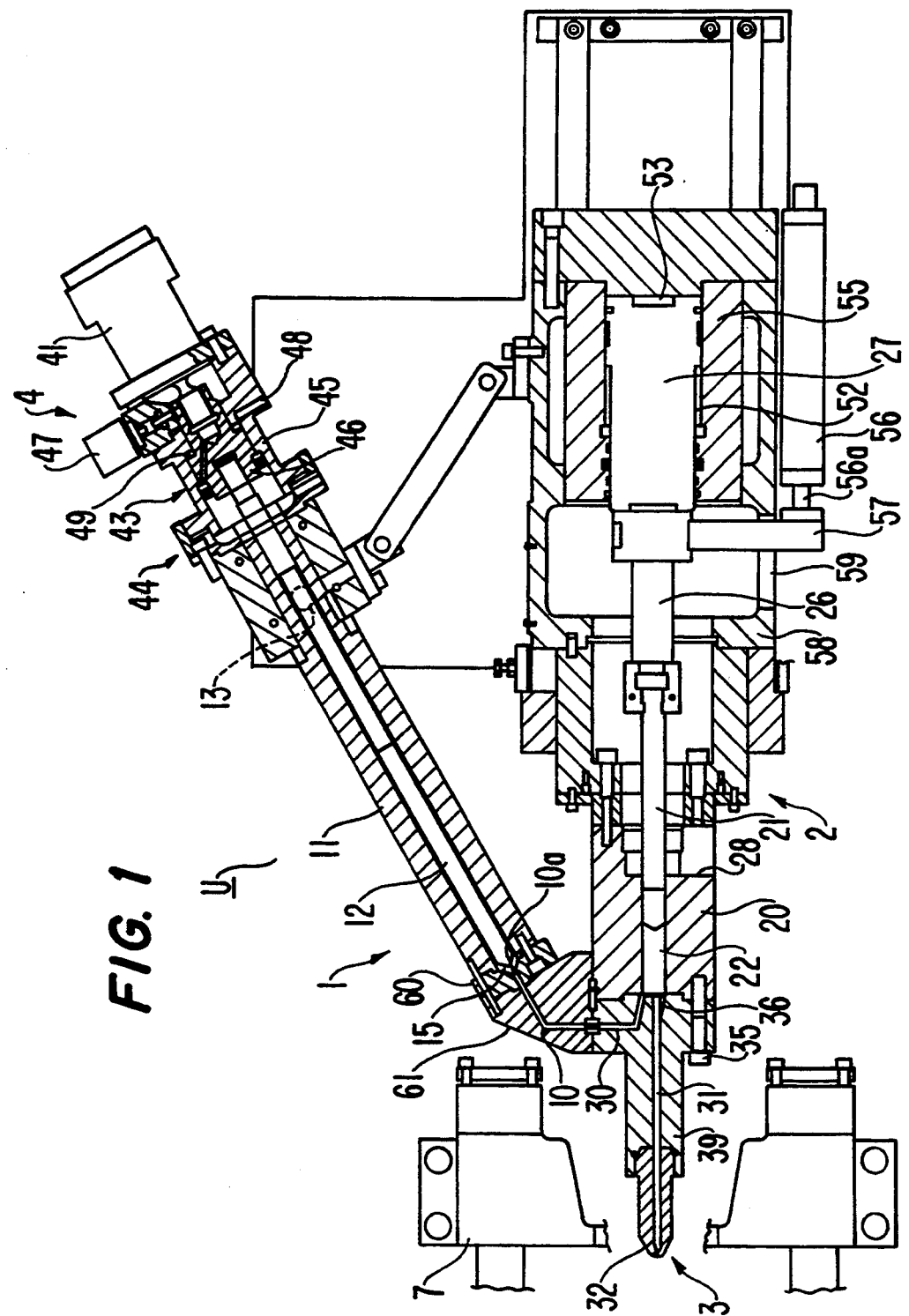
FIG. 1 shows a sectional view of an injection unit of an injection molding machine of the present invention.

As shown in FIG. 1, a screw pre-plasticization type injection molding machine U is equipped with a plasticizing part 1 and an injection part 2. The plasticizing part 1 has a heating cylinder 11 and a kneading screw 12 fitted in the cylinder 11, which forms a plasticizing chamber 15. In addition, there is secured a link block 61 at the tip of the cylinder 11 by way of a bracket 60, which connects the plasticizing part 1 with the injection part 2 with a specified angle in a V-shape. There is provided a conduit 10 between the link block 61 and the bracket 60. The tip of the conduit 10 leads to a conduit 30 extending from an injection chamber 22, which is described later. Furthermore tip of the plasticizing chamber 15 is made conic, and an opening 10a of the conduit 10 is situated at the conic top of the tip. The tip of the screw 1 is also conic. When the screw 12 is at the retreat position, an opening 10a of the conduit 10 connects the plasticizing chamber 15 with an injection chamber 22, which is described later. When the screw 12 advances, the tip of the screw closes the opening 10a, disconnecting the plasticizing chamber 15 with the injection chamber 22.

A screw driving unit 4 is connected with the rear end of the heating cylinder 11 by way of a screw position adjuster 44, and the screw driving unit consists of a forward part 43 and a motor 41 for rotating the screw. The forward part 43 is provided with a cylinder case 45 and a piston member 46, the member 46 being supported on the case 45 rotatable and axially movable to a specified extent, integrally connected at the front thereof with the screw 12 and also integrally connected with the AC electric or hydraulic motor 41 only in terms of rotation. Accordingly, as the rotation of the motor 41 is transmitted to the screw 12 by way of the piston member 46, and oil pressure is introduced to an oil chamber 49 by way of an oil path 48, the piston member 46 advances together with the screw 12. Reference 13 in the drawings denotes a hopper hole for supplying resin material, and 47 is a rotary encoder for checking the screw for rotation.

The injection part 2 is, on the other hand, equipped with an injection cylinder 20 and an injection plunger 21 fitted in the cylinder 20. The cylinder 20 and the plunger 21 form the injection chamber 22. In addition, the injection plunger 21 is connected to a ram 27 by way of a rod 26, and the ram 27 is fitted in a cylinder 55 to form an oil chamber 53 for injection and another oil chamber 52 for return. There is secured a nozzle adapter 39 to the tip of the injection cylinder 20, and the adapter 39 is fitted with a nozzle 3. The nozzle 3 is connectable with a port of a mold secured to a fixed platen 7. The injection part 2 is, in addition, furnished with a linear scale 56 whose movable part 56a is connected with the rod 26 by way of an arm 57 to detect the position of the injection plunger 21. The injection cylinder 20 also has a window 28 for exhausting leaked resin. A case 58 has a window 59 to move.

Figure 2:
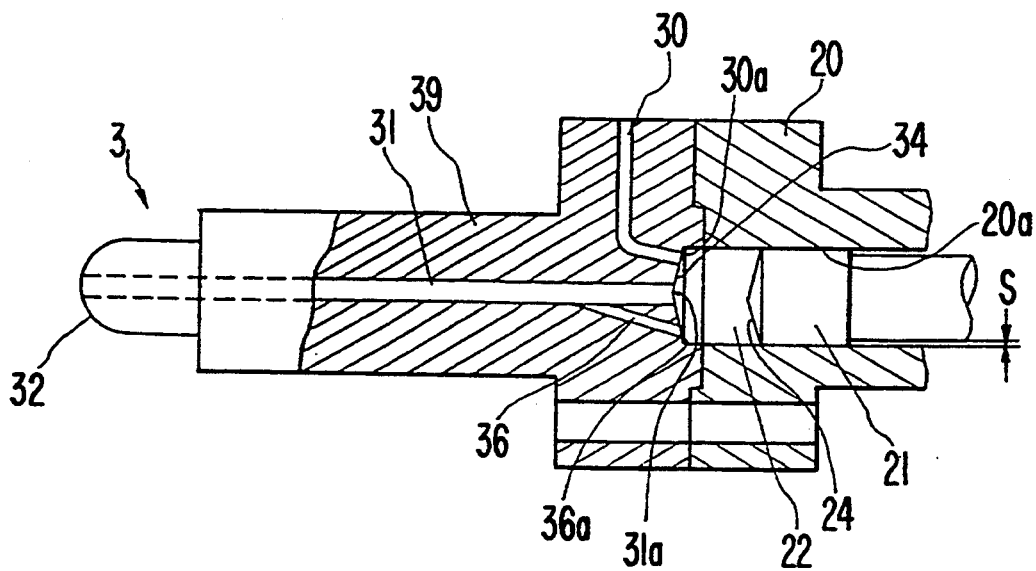
FIG. 2 shows a sectional view of an injection chamber and a nozzle.
Figure 3:
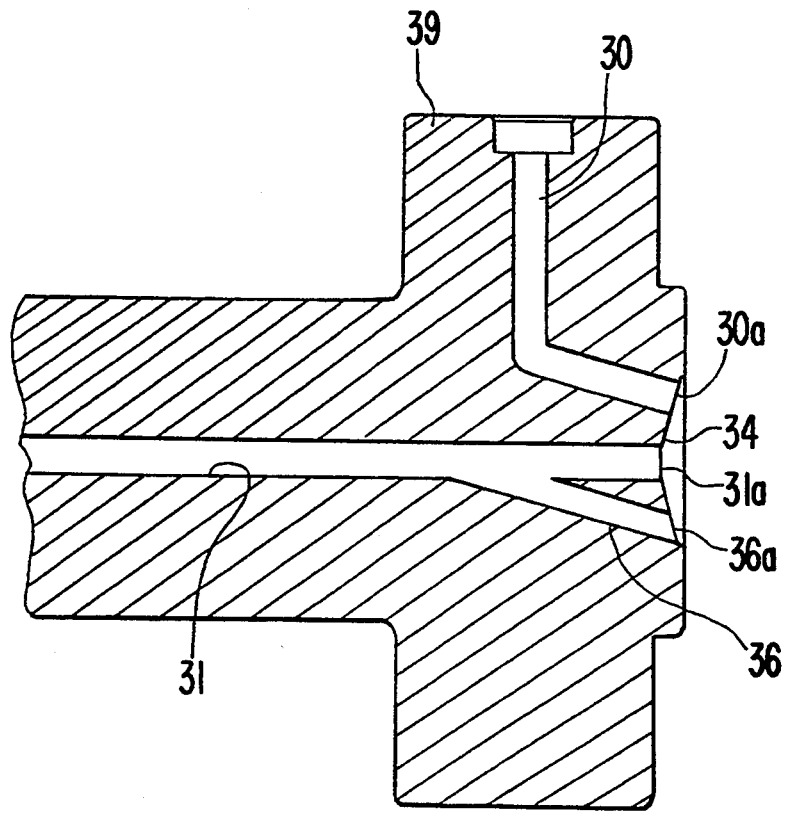
FIG. 3 shows an enlarged sectional view of the nozzle.

The nozzle adapter 39 is concavely shaped in the center of a side end to form a nozzle side-wall 34 of the injection chamber 22, as shown in FIG. 2 and FIG. 3, and the bottom of the nozzle side-wall 34 is formed conically, like the tip face 24 of the plunger 21. Furthermore, there is formed an injection passage 31 penetrating the center of the nozzle adapter 39. The passage 31 has an opening 31a at one end at the center of the nozzle side-wall 34 and leads at the other end to a tip injection part 32 of the nozzle 3. There is formed a conduit 30 in the nozzle adapter 39, and the conduit 30 is matched with and leads at one end to the conduit 10 from the plasticizing chamber 15 and has an opening 30a at the other end opening adjacent the periphery of the injection chamber 22 in the nozzle side-wall 34.

Figure 4:
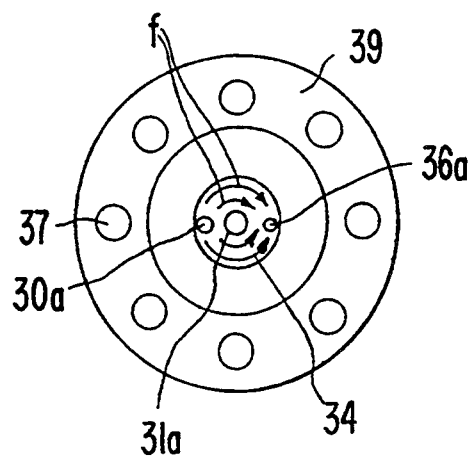
FIG. 4 shows a side view of a nozzle adapter.

As shown in FIG. 3 and FIG. 4, the nozzle adapter 39 is provided with an injection by-pass 36 smaller in diameter than the injection passage 31. The by-pass 36 has an opening 36a at one end adjacent to the periphery of the injection chamber 22 opposite to the opening 30a with the opening 31a of the injection passage therebetween and leads at the other end to the injection passage 31, extending at a slant and straight. The opening 36a of the injection by-pass 36 is situated, therefore, 180-degrees away from the conduit opening 30a in the periphery of the nozzle side-wall 34. Reference 37 in FIG. 4 denotes holes for bolts 35 (FIG. 1) to secure the nozzle adapter 39 to the cylinder 20.

Figure 5:
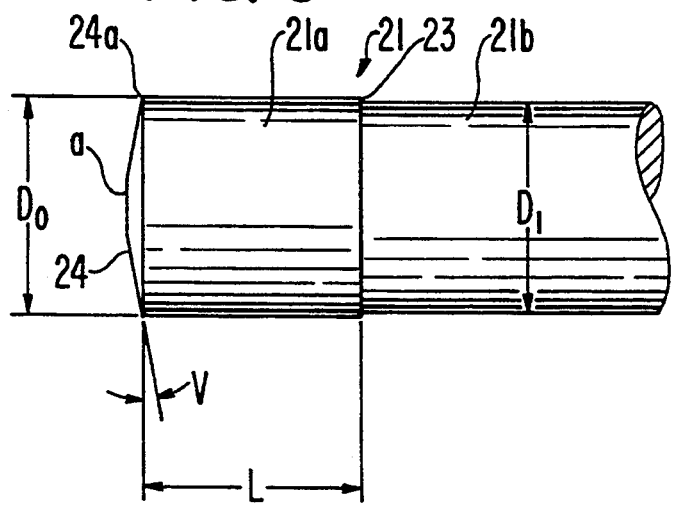
FIG. 5 is an elevation of an injection plunger.

As detailed in FIG. 5, the plunger 21 comprises a head 21a and a shank 21b, and the tip face 24 of the head 21a is made conically convex at a with a slightly flat top and a large obtuse and vertical angle. The head 21a has a diameter of D so as to be in close contact with the circumferential cylinder wall 20a (see FIG. 2) of the injection chamber 22, while the shank 21b has a slightly smaller diameter $D_1$ than the head diameter $D_0$, for example, $D_0 - D_1 = 0.11$ mm. There is produced, accordingly, a clearance S (see FIG. 2) of about 0.05 mm, for instance, between the shank 21b and the circumferential cylinder wall 20a. The length L of the head 21a is almost the same as the diameter $D_0$, or the former is a little longer than the latter so as to ensure a sufficient contact area between the plunger and the circumferential cylinder wall 22a. In addition, the difference in diameter between the head and the shank $(D_0 - D_1 = X)$ is tolerable within a range of $0.05 < X < 1.00$ mm. A step 23 between the head 21a and the shank 21b acts as a scraper to remove dissolved resin (polymer) which leaks from a clearance between the head 21a and the circumferential cylinder wall 20a and gets on the circumferential wall in a thin layer. Since the periphery 24a of the tip face 24 has a large, conical angle, the angle V is made less than 30 degrees, and preferably less than 15 degrees, to allow the periphery 24a to act as a scraper to remove polymer.

According to the present embodiment as thus constructed, the injection plunger 21 is several millimeters away from the nozzle side-wall 34 in the course of holding with pressure, maintaining the pressure at a specified level despite shrinkage due to resin cooled in the XXXXXXX cavity. Upon holding the pressure, weighing starts and polymer plasticized in the plasticizing part 1 passes through the conduits 10 and 30 and is introduced with force to the injection chamber 22 through the opening 30a, as shown in FIG. 4. Since there is a clearance of several millimeters, at the time between the plunger tip face 24 and the nozzle side-wall 34 and the plunger tip face is conic in shape, polymer coming from the conduit opening 30a flows in an arc along the circumferential cylinder wall 22a and the cone A contour line of the plunger tip face, as shown by an arrow f in FIG. 4. Polymer retained at the previous time of injection comes off and is washed away from the nozzle side-wall 34 due to the new flow of polymer and collects around the opening 36a of the injection by-pass 36 farthest from the conduit opening 30a. Part of polymer is mixed with new polymer at the same time, and the plunger 21 retreats.

When the plunger 21 retreats to a certain extent to terminate weighing, the plasticizing screw 12 stops rotating and oil is supplied to the oil chamber 49 of the screw forwarding part 43 at the same time to advance the screw 12 to close the opening 10a of the conduit 10 with the tip of the screw 12. Backflow from the injection chamber 22 to the plasticizing chamber 15 is thereby prevented, and with this, oil is supplied to the oil chamber 53 for injection to advance the ram 27 and the injection plunger 21 for the purpose of injecting.

In injecting, polymer in the injection chamber 22 is introduced to the injection passage 31 through the opening 31a as the plunger 21 advances, and polymer in the portion opposite to the conduit opening 30a, with the injection passage opening 31a therebetween is introduced to the injection passage 31 by way of the injection by-pass 36. These polymers join each other and are injected to the mold cavity through the nozzle tip injection outlet 32. The polymer that is retained after the previous injection and collected around the by-pass opening 36a, because the plunger tip face 24 cone A washes flowing polymer as stated above, is quickly introduced from the injection by-pass 36 to the injection passage 31. In addition, since the cone A also provides agitation, polymer retained in the injection chamber 22 after the previous injection, especially polymer retained in such a portion (A), which may readily allow long retention of the polymer is fully injected from the nozzle 3.

As the injection plunger 21 moves, polymer leaks slightly from between the plunger head 21 and the circumferentially cylinder wall 20a and stays on the wall. However, when the plunger 21 retreats, the step 23 between the shank 21b and the head 21a will work as a scraper to remove the polymer from the wall. Such scraped polymer is pushed out successively while soft, because the clearance S between the shank 21b and the cylinder circumferential wall 20a is very narrow. The polymer is quickly exhausted through the window 28 by way of the clearance S without producing any wear. In addition, in purging to change materials, the scraper step 23 completely removes polymer from the circumferential cylinder wall 20a and exhausts it through the window 28 by retreating the injection plunger 21 more in stroke than the strokes usually applied in the injection cylinder 20.

Figure 6:
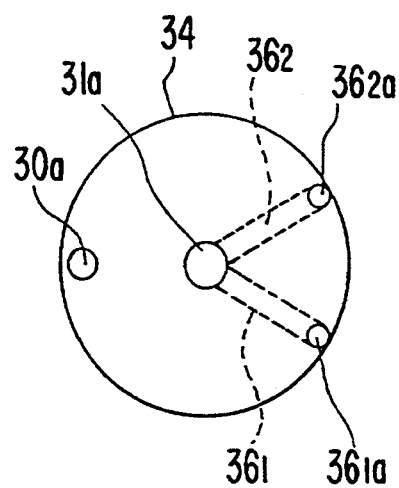
FIG. 6 is a side view of a nozzle side-wall of a partially modified embodiment of the present invention.

A description of a partially modified embodiment will follow with reference to FIG. 6. This embodiment is provided with a plurality of by-passes, such as 36$_1$ and 36$_2$. These by-passes 36$_1$ and 36$_2$ have openings 36$_1$a and 36$_2$a opening to a region opposite to the opening 30a of the conduit 30 with the opening 31a of the injection orifice 31 these between, and lead at the other ends thereof to the injection passage 31. The present embodiment is available when the injection chamber is large in diameter and the portion where polymer is likely to be retained is wide in area. It goes without saying that two or three more by-passes may be provided.

Figure 7:
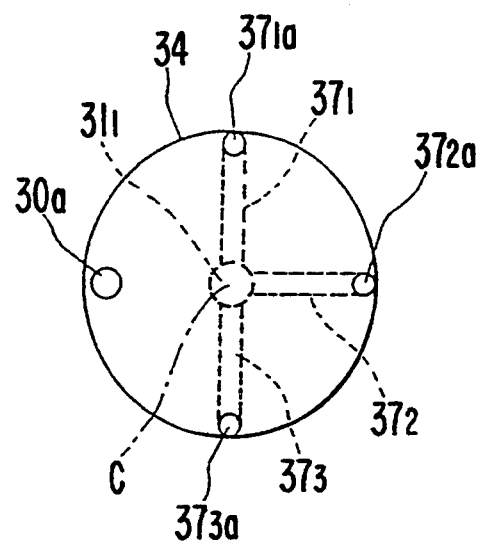
FIG. 7 shows a side view of a nozzle side-wall of another embodiment of the present invention.
Figure 8:
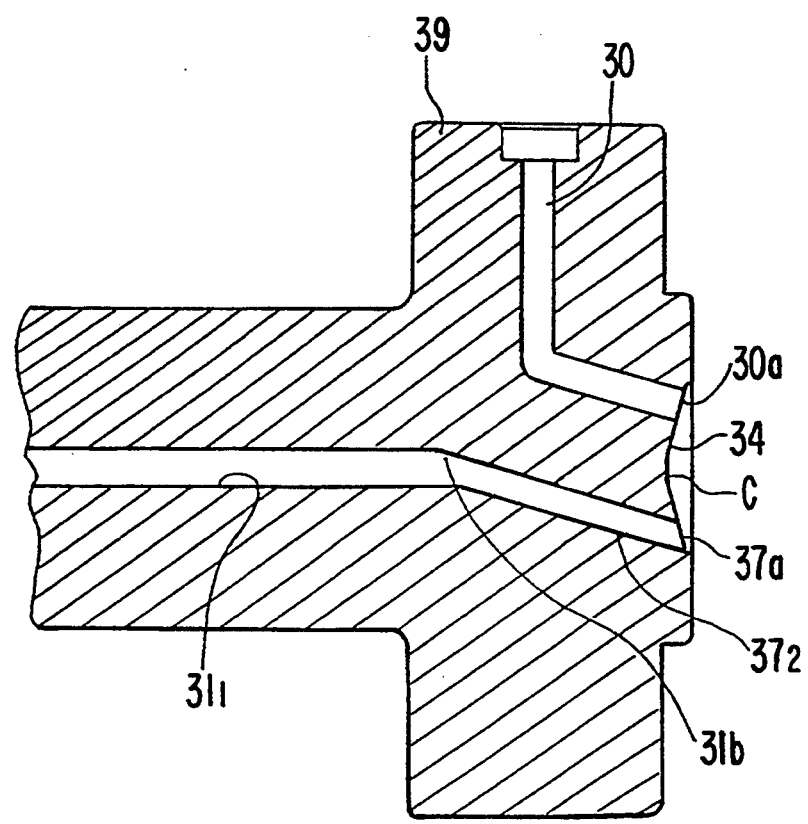
FIG. 8 shows an enlarged sectional view of the nozzle.
Figure 13:
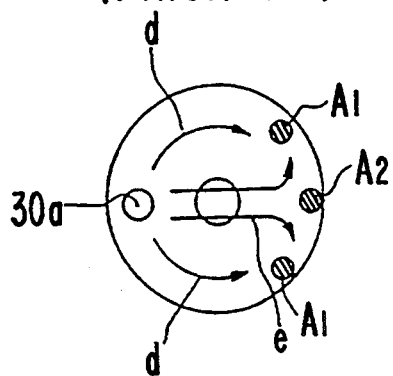
FIG. 13 is a side view of the injection chamber of FIG. 10.
Figure 9:
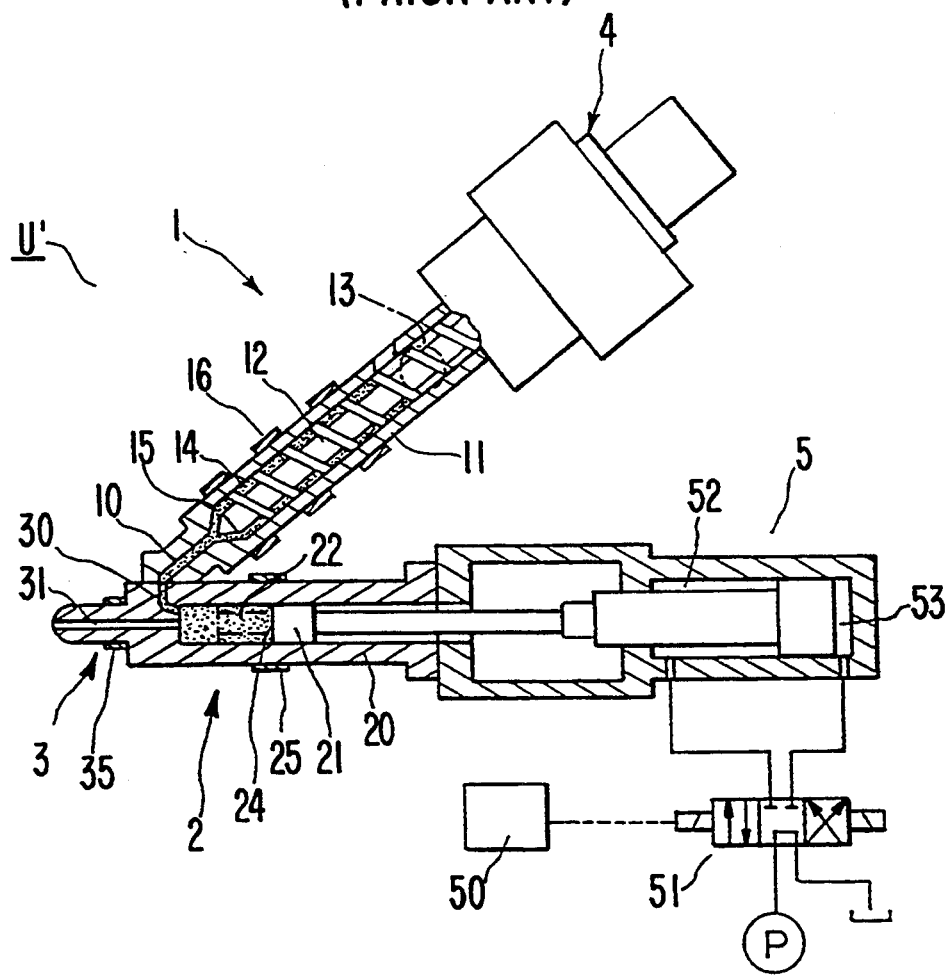
FIG. 9 shows a sectional view of an injection unit of a conventional (prior art) injection molding machine.
Figure 10:
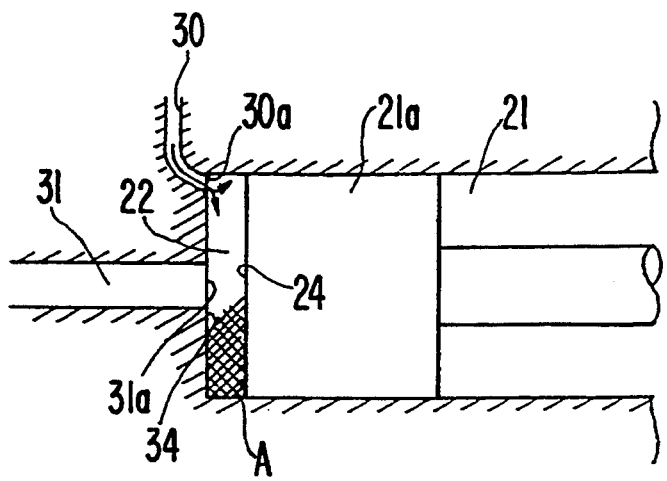
FIG. 10 is a sectional view of injection chamber of the injection unit of FIG. 9.
Figure 11:
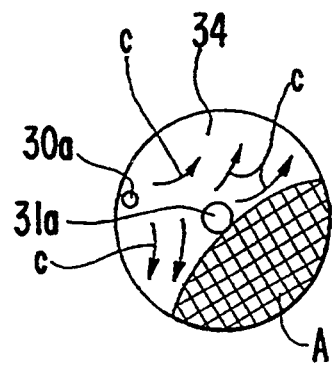
FIG. 11 is a side view of the injection chamber of FIG. 10.
Figure 12:
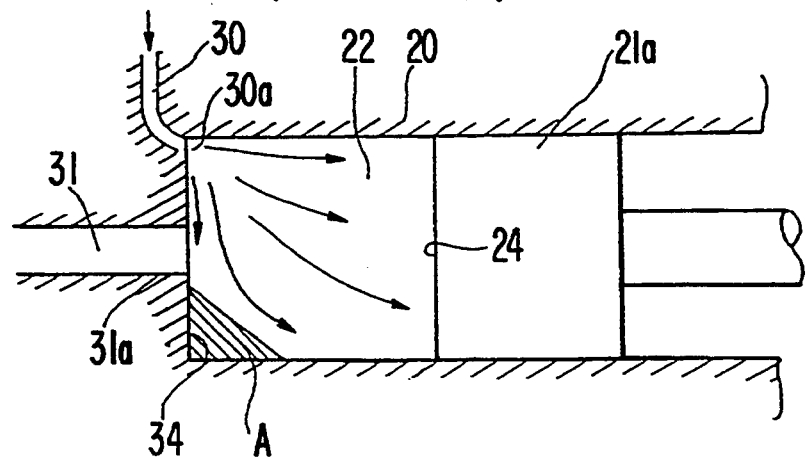
FIG. 12 is a sectional view showing a plunger of the injection unit of FIG. 9 in a retreat position.

Another embodiment will be described with reference to FIG. 7 and FIG. 8.

This embodiment is featured by an injection passage 31$_1$ provided in the center of the nozzle adapter 39. The passage 31$_1$ does not penetrate the wall 34, but ends at 31b on the side of the injection chamber, and leads at the other end to the tip injection outlet 32. It is also featured by three injection by-passes 37$_1$, 37$_2$ and 37$_3$ branching from portion 31b. The by-passes have openings 37$_1$a, 37$_2$a and 37$_3$a opening on the periphery of the side-wall 34 and spaced at 90 degree intervals about the injection chamber center C in a region where the conduit opening 30a in the nozzle side-wall 34 is not situated.

According to the present embodiment, therefore, polymer in the injection chamber 22 is introduced to the injection passage 31$_1$ by way the plural injection by-paths 37$_1$, 37$_2$ and 37$_3$ and injected from the nozzle 3 as the plunger 21 advances for the purpose of injecting. Because polymer is introduced to the nozzle 3 by way of the plural injection by-passes dispersed about the periphery of the side-wall 34 and because of polymer washing and agitating with the plunger tip face 24 and cone A. In the course of weighing, the polymer which is retained after the previous injection will be completely injected through the nozzle.

The plunger tip face may not only be conic, but also spheric and headless conic. It is acceptable if the tip face is higher in the center than in the periphery.

TECHNICAL ADVANCES OF THE INVENTION

As described earlier, with injection by-pass, the present invention enables such polymer as retained after the previous injection to be introduced to the nozzle in the course of injecting to be very promptly replaced with new polymer in the injection chamber. This prevents resin from being retained long in the injection chamber, allowing such resin as is prone to thermal decomposition to be put to exact and sure injection molding. In addition, the present invention assures that color changes may be quickly and smoothly carried out. It will also help a pre-plasticization type injection molding machine, above all, which prevents backflow to the plasticizing chamber by advancing the screw, enjoy a higher reliability.

In particular, if a plunger whose tip face is higher in the center is used in weighing, new polymer coming from the conduit opening exfoliates retained polymer observed on the tip face and lets the retained polymer on the nozzle side-wall come off, because the conduit opening is adjacent to the plunger tip face, and the retained polymer is washed away to be collected around the injection by-pass openings. Therefore, polymer left after the previous injection is quickly introduced to the nozzle through the injection by-pass to be completely exhausted from the injection chamber.

What is claimed is:

1. An apparatus comprising:
    a plasticizing part for plasticizing synthetic resin material, said plasticizing part comprising a heating cylinder having a screw and a plasticizing chamber therein, said plasticizing chamber having a tip, and a drive mechanism for rotating and advancing said screw;
    an injection part for injecting plasticized resin material, said injection part comprising an injection cylinder having an injection plunger and an injection chamber therein, said injection chamber having a tip;
    a nozzle connected with said injection chamber of said injection cylinder for receiving plasticized resin material from said injection chamber, said injection chamber having a nozzle side-wall defined by said nozzle;
    a conduit connecting said tip of said plasticizing chamber with said tip of said injection chamber, said conduit having an opening on the periphery of said nozzle side-wall;
    an injection passage in said nozzle having an opening at one end thereof at the center of said nozzle side-wall and another end at a tip of said nozzle; and
    an injection by-pass having an opening at one end thereof located at the periphery of said nozzle side-wall at a region of said nozzle side-wall wherein plasticized resin material supplied from said conduit tends to remain, said region being located opposite to said opening of said conduit on said nozzle side-wall, said region and said opening of said conduit having said opening of said injection passage therebetween, and another end connected to said injection passage.

2. The apparatus of claim 1, wherein said opening of said by-pass is located 180° from said opening of said conduit about the center of said nozzle side-wall.

3. The apparatus of claim 1, and further comprising a second injection by-pass having an opening at one end thereof at said region of said nozzle side-wall and another end connected to said injection passage.

4. The apparatus of claim 1, wherein said injection plunger has an end face that has a center higher than the periphery thereof.

5. The apparatus of claim 4, wherein said end face of said injection plunger is conic in shape.

6. The apparatus of claim 1, wherein said nozzle side-wall of said injection chamber has a concave surface.

7. The apparatus of claim 6, wherein said nozzle side-wall has a bottom cone surface and said opening of said injection passage is located at the apex of said cone surface.

8. The apparatus of claim 1, wherein said end face of said injection plunger is conic in shape, and said nozzle side-wall of said injection chamber has a concave surface with a conic bottom.

9. An apparatus comprising:
- a plasticizing part for plasticizing synthetic resin material, said plasticizing part comprising a heating cylinder having a screw and a plasticizing chamber therein, said plasticizing chamber having a tip, and a drive mechanism for rotating and advancing said screw;
- an injection part for injecting plasticized resin material, said injection part comprising an injecting cylinder having an injection plunger and an injection chamber therein, said injection chamber having a tip
- a nozzle connected with said injection chamber of said injection cylinder for receiving plasticized resin material from said injection chamber, said injection chamber having a nozzle side-wall defined by said nozzle;
- a conduit connecting said tip of said plasticizing chamber with said tip of said injection chamber, said conduit having an opening on the periphery of said nozzle side-wall;
- an injection passage extending in said nozzle to a tip of said nozzle; and
- a plurality of injection by-passes, each said by-pass having an opening at the periphery of and in said nozzle side-wall at a region of said nozzle side-wall where plasticized resin material supplied from said conduit tends to remain, said region being located opposite to said conduit on said nozzle side-wall, and said injection by-passes extending from said opening to said injection passage for introducing plasticized synthetic resin material to said injection passage from said injection chamber.

10. The apparatus of claim 9, wherein said injection plunger has an end face that has a center higher than the periphery thereof.

11. The apparatus of claim 10, wherein said end face of said injection plunger is conic in shape.

12. The apparatus of claim 9, wherein said nozzle side-wall of said injection chamber has a concave surface.

13. The apparatus of claim 9, wherein said end face of said injection plunger is conic in shape, and said nozzle side-wall of said injection chamber has a concave surface with a conic bottom.

* * * * *